(12) United States Patent
Liu et al.

(10) Patent No.: US 9,979,490 B2
(45) Date of Patent: May 22, 2018

(54) EXPLOITING FREQUENCY DIVERSITY ON A SUB-BAND BASIS FOR OPTICAL TRANSMISSION PERFORMANCE ENHANCEMENT

(71) Applicant: Futurewei Technologies, Inc., Plano, TX (US)

(72) Inventors: Xiang Liu, Marlboro, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 276 days.

(21) Appl. No.: 14/711,208

(22) Filed: May 13, 2015

(65) Prior Publication Data
US 2015/0333834 A1    Nov. 19, 2015

Related U.S. Application Data

(60) Provisional application No. 61/996,807, filed on May 14, 2014.

(51) Int. Cl.
*H04J 14/02* (2006.01)
*H04B 10/548* (2013.01)
(Continued)

(52) U.S. Cl.
CPC .......... *H04B 10/548* (2013.01); *H04B 10/25* (2013.01); *H04B 10/27* (2013.01); *H04B 10/60* (2013.01);
(Continued)

(58) Field of Classification Search
CPC ...... H04B 10/548; H04B 10/25; H04B 10/27; H04B 10/60; H04B 10/272;
(Continued)

(56) References Cited

U.S. PATENT DOCUMENTS 7,406,261 B2 *   7/2008   Shattil .................... H04L 27/00
                                                    398/182
7,502,310 B2 *   3/2009   Hwang .................. H04L 5/023
                                                    370/208

(Continued)

FOREIGN PATENT DOCUMENTS

WO   WO 2012175697 A1 *  12/2012  ......... H04B 10/2581
WO   WO 2013186361 A1 *  12/2013  ............... H04B 1/69

OTHER PUBLICATIONS

Liu, et al., "Phase-Conjugated Twin Waves for Communication Beyond the Kerr Nonlinearity Limit," Nature Photonics, Published Online: May 26, 2013, DOI: 10.1038/NPHOTON.2013.109, 9 pages.

(Continued)

*Primary Examiner* — Hibret Woldekidan
(74) *Attorney, Agent, or Firm* — Conley Rose, P.C.

(57) ABSTRACT

An optical data transmission method comprising partitioning an optical signal into a plurality of frequency sub-bands, generating a signal frequency mapping that rearranges the plurality of frequency sub-bands, choosing a plurality of frequency components based on the signal frequency mapping to form a set of frequency components, and transmitting the set of frequency components using frequency diversity transmission. An optical data receiving method comprising obtaining a signal frequency mapping for an original signal, receiving an optical signal that comprises a plurality of frequency sub-bands, re-arranging the plurality of frequency sub-bands using the signal frequency mapping to generate a restored original signal, and processing the restored original signal to recover an original data sequence.

15 Claims, 15 Drawing Sheets

(51) Int. Cl.
*H04B 10/27* (2013.01)
*H04B 10/25* (2013.01)
*H04B 10/60* (2013.01)
*H04L 27/26* (2006.01)

(52) U.S. Cl.
CPC ...... *H04L 27/2601* (2013.01); *H04L 27/2697* (2013.01)

(58) Field of Classification Search
CPC . H04J 14/0298; H04J 14/0282; H04L 1/0612; H04L 27/2601; H04L 27/2697; H04L 25/03828; H04L 1/0606; H04L 1/0618; H04L 27/2657; H04L 27/2665; H04L 5/0023; H04L 2025/03414; H04W 72/0453
USPC .............. 398/66, 79, 71, 70, 69, 187, 76, 78
See application file for complete search history.

(56) References Cited

U.S. PATENT DOCUMENTS

| | | | | |
|---|---|---|---|---|
| 8,077,692 | B2* | 12/2011 | Khandekar | H04L 5/0007 370/208 |
| 8,484,272 | B2* | 7/2013 | Gore | H04L 5/0044 370/208 |
| 8,737,191 | B2* | 5/2014 | Freda | H04L 27/2602 370/208 |
| 8,818,436 | B2* | 8/2014 | Guan | H04L 5/00 370/329 |
| 9,008,512 | B2* | 4/2015 | Nazarathy | H04B 10/272 398/65 |
| 9,225,575 | B2* | 12/2015 | Kuchi | H04L 27/2646 |
| 9,503,284 | B2* | 11/2016 | Nazarathy | H03H 17/0266 |
| 9,590,730 | B2* | 3/2017 | Liu | H04B 10/2507 |
| 9,806,837 | B2* | 10/2017 | Nazarathy | H04J 11/0023 |
| 2009/0116573 | A1* | 5/2009 | Gaal | H03M 13/2703 375/267 |
| 2010/0178057 | A1* | 7/2010 | Shieh | H04L 25/0224 398/79 |
| 2011/0141876 | A1* | 6/2011 | Kuchi | H04B 7/0413 370/203 |
| 2011/0142003 | A1* | 6/2011 | Kuchi | H04B 7/0413 370/330 |
| 2013/0016966 | A1* | 1/2013 | Jansen | H04L 25/03828 398/25 |
| 2013/0223840 | A1* | 8/2013 | Chang | H04J 14/08 398/58 |
| 2014/0314410 | A1* | 10/2014 | Mumtaz | H04B 10/2581 398/65 |

OTHER PUBLICATIONS

Liu, et al., "Scrambled Coherent Superposition for Enhanced Optical Fiber Communication in the Nonlinear Transmission Regime," Optics Express 19088, Aug. 13, 2012, vol. 20, No. 17, 8 pages.
Meon, et al., "Use of Space-Time Coding in Coherent Polarization-Multiplexed Systems Suffering From Polarization-Dependent Loss," Optics Letters, Nov. 1, 2010, vol. 35, No. 21, pp. 3547-3549.
Yi, X., et al., "Experimental Demonstration of Digital Coherent Superposition of Optical OFDM Subcarrier Pairs for Mitigation of Linear and Nonlinear Phase Noise," Optical Society of America, 2014, 3 pages.
Le, S. T., et al., "Experimental Demonstration of Data-dependent Pilot-aided Phase Noise Estimation for CO-OFDM," OFC, Mar. 9, 2014, 3 pages.
Liu, X., et al., "Fiber-Nonlinearity-Tolerant Superchannel Transmission via Nonlinear Noise Squeezing and Generalized Phase-Conjugated Twin Waves," Journal of Lightwave Technology, vol. 32, No. 4, Feb. 15, 2014, pp. 766-775.
Le, S. T., et al., "Phase-conjugated Subcarrier Coding for Fibre Nonlinearity Mitigation in CO-OFDM Transmission," ECOC, 2014, 3 pages.
Jaouen, Y., et al., "Space-Time Codes for Fiber Communications: Coding Gain and Experimental Validation," 8th IEEE, IET International Symposium on Communication Systems, Networks and Digital Signal Processing, 2012, 5 pages.
Liu, X., et al., "Twin-Wave-Based Optical Transmission With Enhanced Linear and Nonlinear Performances," Journal of Lightwave Technology, vol. 33, No. 5, Mar. 1, 2015, pp. 1037-1043.
Foreign Communication From A Counterpart Application, PCT Application No. PCT/US2015/030551, English Translation of International Search Report dated Aug. 10, 2015, 8 pages.
Foreign Communication From A Counterpart Application, PCT Application No. PCT/US2015/030551, English Translation of Written Opinion dated Aug. 10, 2015, 11 pages.

\* cited by examiner

EXPLOITING FREQUENCY DIVERSITY ON A SUB-BAND BASIS FOR OPTICAL TRANSMISSION PERFORMANCE ENHANCEMENT

CROSS-REFERENCE TO RELATED APPLICATIONS

The present application claims priority to U.S. Provisional Application No. 61/996,807 filed May 14, 2014 by Xiang Liu, et al., and entitled "Exploiting frequency diversity on a sub-band basis for optical transmission performance enhancement," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical access networks, it is desirable to provide support for a variety of services. These services may include, fiber-to-the-home (FTTH) services, fiber-to-the-building (FTTB) services, enterprise/business connectivity services, and services for mobile backhaul and front-haul supporting fourth generation (4G) and future fifth generation (5G) wireless communication. To cost-effectively support these diverse applications, optical access networks need to provide high-speed connectivity and wide distance coverage. However, with the increase of optical transmission speed and/or transmission distance, signal degradation becomes more severe and eventually prevents the realization of high-speed wide-coverage optical access. In optical transport networks, there is also an increasing demand to reduce the cost of the optical transceivers by using intensity-modulation and direct-detection (IM/DD). However, IM/DD formats suffer poor transmission performance as compared to coherent-detection formats.

SUMMARY

In one embodiment, the disclosure includes an optical data transmission method comprising partitioning an optical signal into a plurality of frequency sub-bands, generating a signal frequency mapping that rearranges the plurality of frequency sub-bands, choosing a plurality of frequency components based on the signal frequency mapping to form a set of frequency components, and transmitting the set of frequency components using frequency diversity transmission.

In another embodiment, the disclosure includes an optical data receiving method comprising obtaining a signal frequency mapping for an original signal, receiving an optical signal that comprises a plurality of frequency sub-bands, re-arranging the plurality of frequency sub-bands using the signal frequency mapping to generate a restored original signal, and processing the restored original signal to recover an original data sequence.

In yet another embodiment, the disclosure includes an apparatus comprising a transmitter configured to employ frequency diversity transmission, a memory, and a processor coupled to the transmitter and the memory, and configured to partition an optical signal into a plurality of frequency sub-bands, generate a plurality of signal frequency mappings that rearranges the plurality of frequency sub-bands, choose a plurality of frequency components based on the signal frequency mappings to form a set of frequency components, and transmit the set of frequency components.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for enhancing transmission performance of an optical signal using frequency-domain diversity on a sub-band basis by equalizing the signal-to-noise ratio (SNR) across a frequency range of interest. Using frequency-domain diversity on a sub-band basis may be performed with or without redundancy. Digital coherent superposition (DCS) of multiple spectrally-inverted (SI) sub-bands of the same original signal can be applied when redundancy is used. Alternatively, space-time codes (e.g., Golden code and Silver code) can be applied in the frequency-domain when no redundancy is used. For example, space codes may be similar to those described in, "Use of space-time coding in coherent polarization-multiplexed systems suffering from polarization-dependent loss," by Eado Meron, et al., published in 2010, which is hereby incorporated by reference as if reproduced in its entirety. Various embodiments may be readily applicable to intensity-modulation and direct-detection (IM/DD) signal formats such as direct-detection (DD)-orthogonal frequency-division multiplexing (OFDM) or discrete multi-tone (DMT). Using frequency-domain diversity on a sub-band basis may reduce SNR non-uniformity in the frequency-domain, may increase transmission distances, may increase link loss budgets, and may provide adaptive performance gain.

Figure 1:
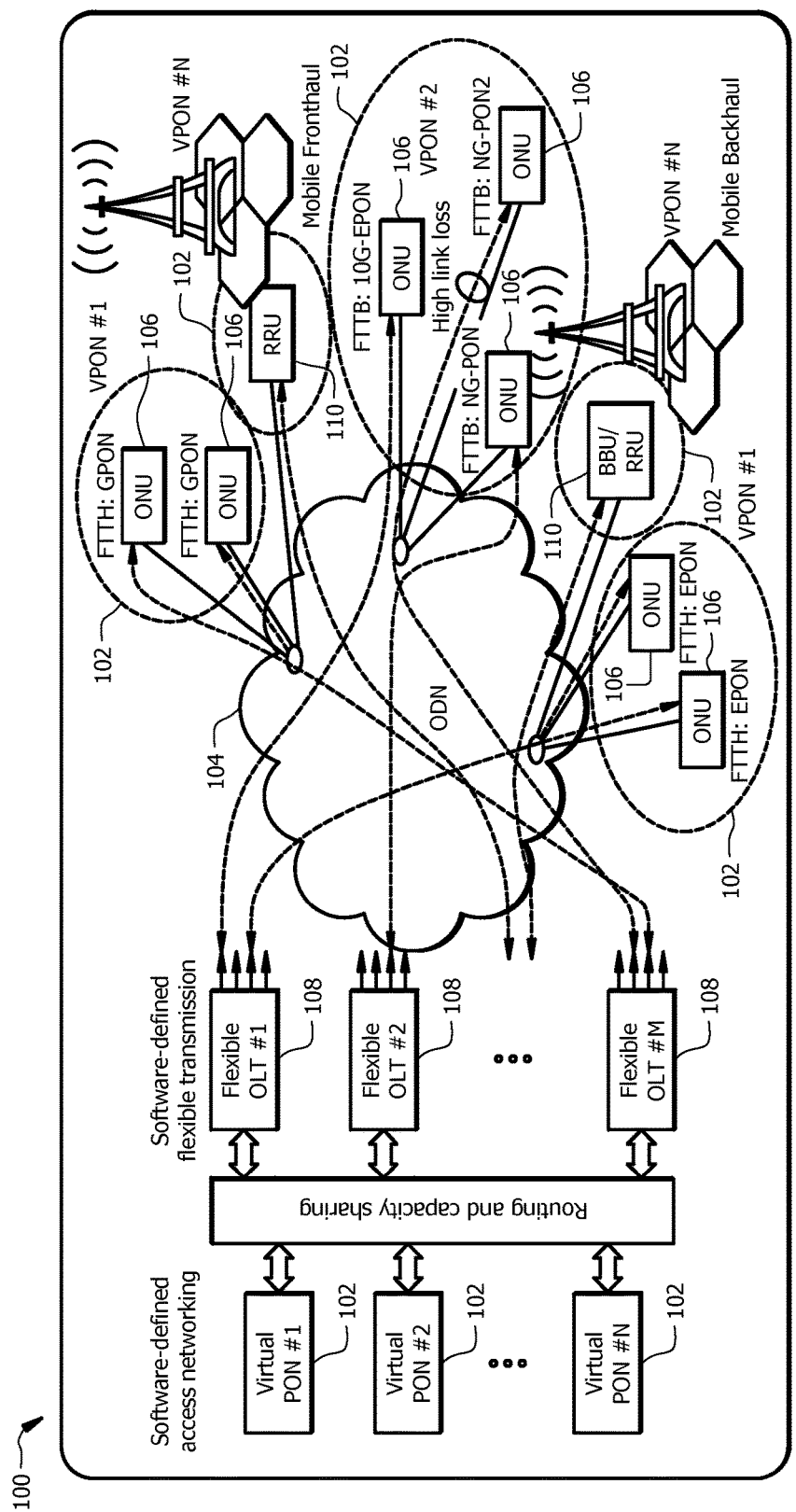
FIG. 1 is a schematic of an embodiment of an optical access network.

FIG. 1 is a schematic of an embodiment of an optical access network 100. Optical access network 100 comprises an optical distribution network (ODN) 104 that provides a variety of services over a wide coverage area. ODN 104 comprises a plurality of virtual passive optical networks (VPONs) 102 and communicates data traffic between VPONs 102 using optical line terminals (OLTs) 108. OLTs 108 are configured to provide software-defined flexible transmission that is reconfigurable or flexible. A VPON 102 is configured to implement software-defined networking between optical network units (ONUs) 106, fiber-to-the-home (FTTH) networks, Ethernet passive optical networks (EPONs), gigabit passive optical networks (GPONs), baseband units (BBUs) and remote radio units (RRUs) 110 for mobile backhauls and/or front hauls, any other type of networking devices or networks as would be appreciated by one of ordinary skill in the art upon viewing this disclosure, or combinations thereof. VPONs 102 are configured to provide services for a variety of end users and applications. For example, some end users (e.g., business users) may require high-speed connectivity. Some applications (e.g., mobile backhaul and front-haul) may demand high loss budgets or high dispersion tolerances. Some end users may be geographically distant from OLTs 108 and may have transmission distances beyond 40 kilometers (km), for example, from about 60 km to about 100 km. Optical access network 100 may be configured as shown or in any other suitable configuration.

Figure 2:
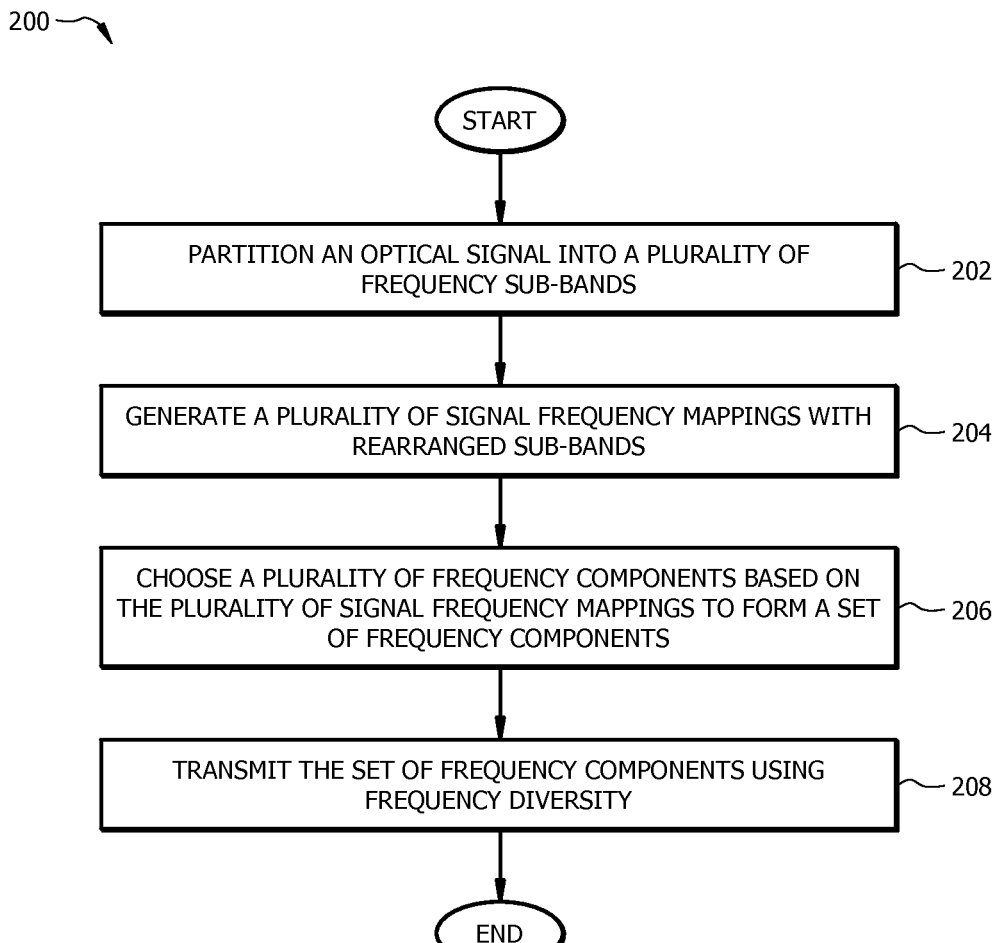
FIG. 2 is a flowchart of an embodiment of an optical data transmission method.

FIG. 2 is a flowchart of an embodiment of an optical data transmission method 200. Method 200 may be implemented to partition an optical signal into a plurality of frequency sub-bands, to generate a plurality of signal frequency mappings and/or sub-band mappings, and to transmit a chosen set of frequency components using frequency diversity. Method 200 can be implemented by a network node, for example, OLT 108 and ONU 106 in FIG. 1. At step 202, the network node partitions the bandwidth of an optical signal into a plurality of frequency sub-bands such that each sub-band contains one or more consecutive frequency locations. Each frequency location is associated with a frequency index. For example, the bandwidth of an optical signal is partitioned into $2^n$ frequency sub-bands, where n is an integer value. At step 204, the network node generates a plurality of signal frequency mappings with rearranged sub-bands. Examples of signal frequency mappings include, but are not limited to, spectrally inverted sub-bands, redundant sub-bands, and encoded sub-bands. Alternatively, any other suitable signal frequency mapping may be employed as would be appreciated by one of ordinary skill in the art upon viewing this disclosure. At step 206, the network node chooses a plurality of frequency components based on the signal frequency mappings to form at least one set of frequency components. The plurality components may comprise one or more frequency sub-bands that may or may not have the same bandwidth size. At step 208, the network node transmits the at least one set of frequency components using frequency diversity transmission.

Figure 3:
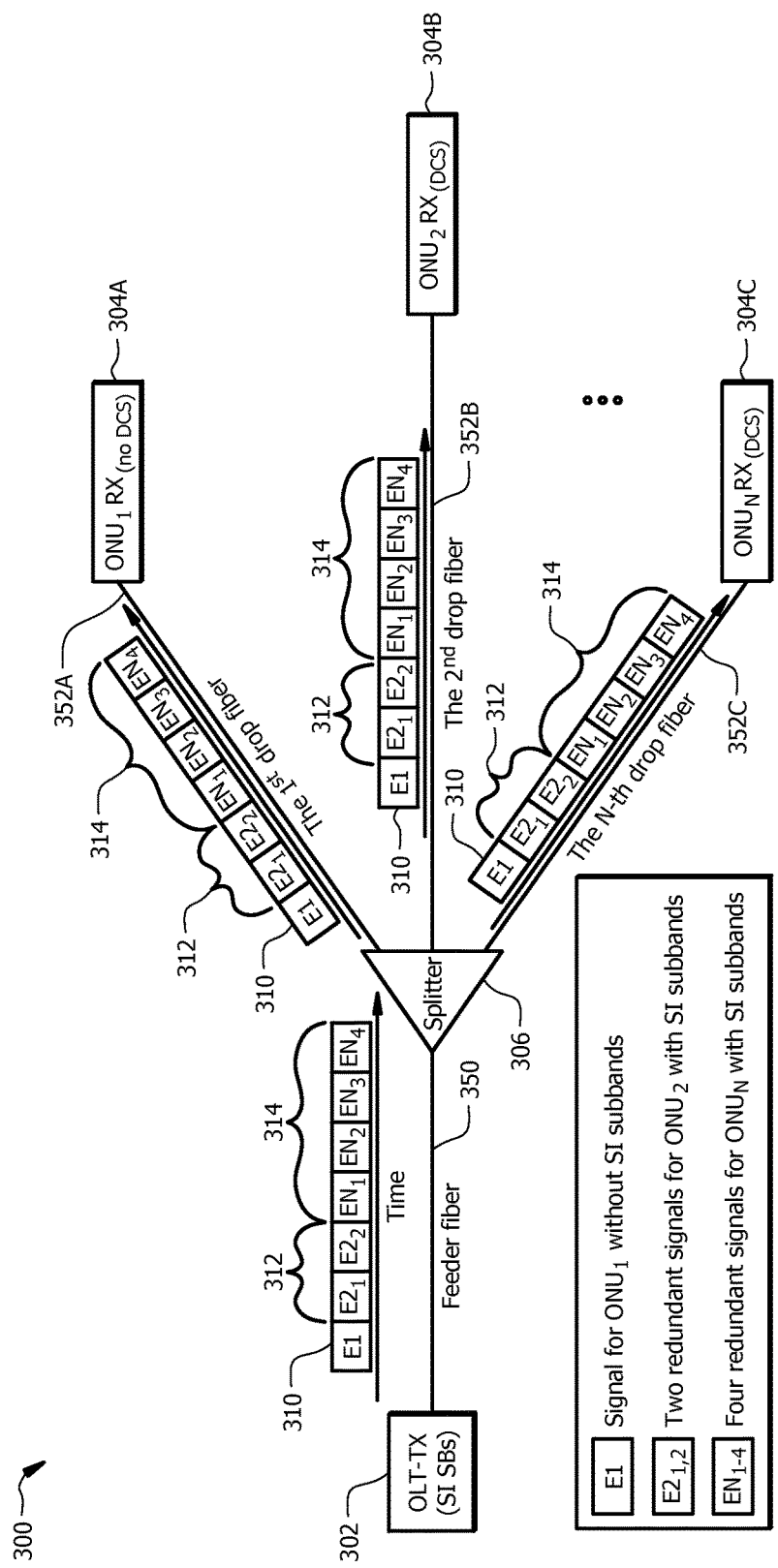
FIG. 3 is a schematic diagram of an embodiment of an optical network communicating data traffic between an optical line termination (OLT) and a number of optical network units (ONUs).

FIG. 3 is a schematic diagram of an embodiment of an optical network 300 communicating data traffic between an OLT 302 and a number of ONUs 304A-304C. OLT 302 and ONUs 304A-304C may be configured similarly to OLT 108 and a number of ONU 106 in FIG. 1, respectively. OLT 302 is optically coupled to a splitter 306 using a feeder fiber 350. Splitter 306 is optically coupled to each of the ONUs 304A-304C using drop fibers 352A-352C, respectively. Optical network 300 may be configured as shown or in any other suitable configuration.

In FIG. 3, OLT 302 is configured as a transmitter (TX) and ONUs 304A-304C are configured as receivers (RXs). Data traffic is communicated in a downstream direction from OLT 302 to ONUs 304A-304C, but it can be easily extended to illustrate data traffic being communicated in an upstream direction. Data traffic is communicated between OLT 302 and ONUs 304A-304C using multiple correlated signals when an ONU is configured to process digital coherent superposition (DCS). In DCS, redundant signals (e.g., copies) or representations of the same original signal are coherently or constructively combined in the digital domain. The redundant signals may have the same time-domain or frequency-domain mapping as the original signal to realize coherent superposition. Additional information for DCS may be found in, "Scrambled coherent superposition for enhanced optical fiber communication in the nonlinear transmission regime," by Xiang Liu, et al., published in 2012, which is hereby incorporated by reference as if reproduced in its entirety.

OLT 302 is configured to transmit data traffic using spectrally-inverted (SI) sub-bands or without SI sub-bands. An SI sub-band has a frequency-dependent electric field, $E_{inv}(f)$, that can be expressed as:

$$|E_{inv}(f)|=|E_0(f)|$$

where $E_0(f)$ is the frequency-dependent electric field of the original sub-band and |x| denotes the absolute value of x. In an embodiment, SI sub-bands are generated using a digital signal processor (DSP). ONUs 304A-304C are configured to remap correlated signals of an original frequency mapping before coherently superimposing the correlated signals to obtain an enhanced signal quality. As an example, OLT 302 may be configured to send data 310 for ONU 304A without SI sub-bands, to send data 312 for ONU 304B using two redundant signals with SI sub-bands, and to send data 314 to ONU 304C using four redundant signals with SI sub-bands. Redundant signals refer to when the same information is carried by a pair of SI sub-bands. The number of SI sub-bands used is referred to as a redundancy factor. For example, the redundancy factor is two when one pair of SI sub-bands is used to carry the same information. In general, the redundancy factor is 2N when N pairs of SI sub-bands are used to carry the same information.

Figure 4:
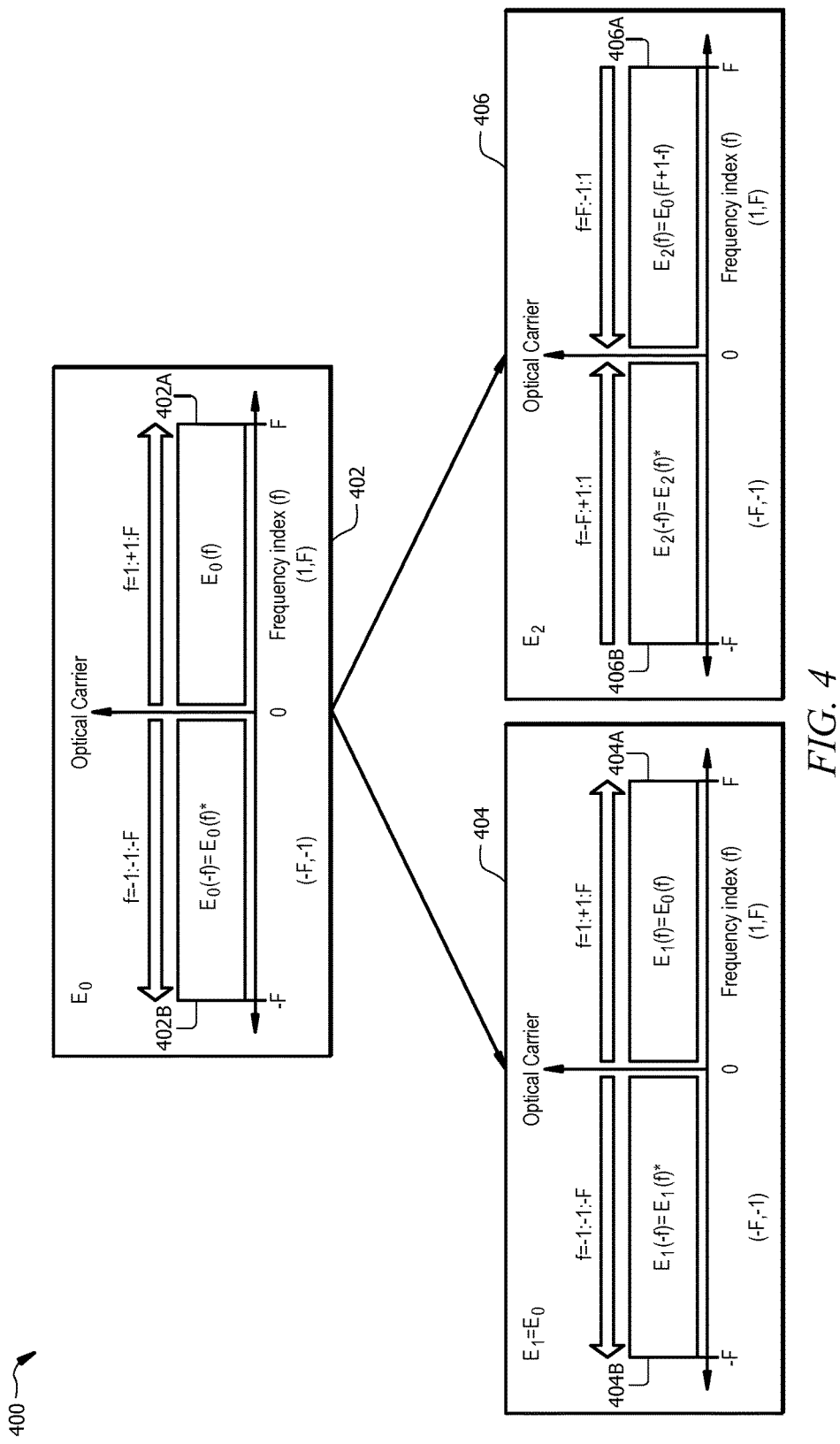
FIG. 4 is a schematic diagram of an embodiment of a spectrally inverted sub-band mapping or two correlated signals.

FIG. 4 is a schematic diagram of an embodiment of a spectrally inverted sub-band mapping 400 for two correlated signals. Spectrally inverted sub-band mapping 400 maps an original signal to a pair of correlated signals with SI sub-bands. Pairs of correlated signals may also be referred to as twin signals. Correlated signals are generated by a transmitting network node, for example, OLT 302 and ONUs 304A-304C in FIG. 3.

At block 402, an original signal $E_0$ is obtained. The original signal $E_0$ substantially conforms to a Hermitian symmetry in the frequency-domain such that $E_0(-f)=E_0(f)^*$, where f represents an orthogonal frequency-division multiplexing (OFDM) subcarrier index, E(f) is the signal E-field at frequency f, and "E( )*" indicates a complex conjugate of E( ), for example, $E_0(f)^*$ represents the complex conjugate of $E_0(f)$. The original signal $E_0$ is generated to ensure that it has a real value for amplitude modulation. The original signal $E_0$ can be made a positive value using a suitable direct current (DC) carrier at frequency f=0. A suitable DC carrier can be generated by appropriately biasing a modulator.

The original signal $E_0$ comprises a first sub-band 402A for $E_0(f)$ and a second sub-band 402B for $E_0(-f)=E_0(f)^*$. The first sub-band 402A spans from a frequency index of 1 to a frequency index of F, where F represent the largest positive sub-carrier index. The frequency index of the first sub-band 402A is incremented in a direction from 1 to F which can be expressed as f=(1:1:F), where (x:y:z) denotes a series of integers starting from x and ending at z with an increment of y. The second sub-band 402B spans from a frequency index of −1 to a frequency index of −F. The frequency index of the second sub-band 402B is decremented in a direction from −1 to −F which can be expressed as f=(−1:−1:−F).

At block 404, a first correlated signal $E_1$ is generated based on the original signal $E_0$. A correlated signal has $2^n$ SI sub-bands with a fixed bandwidth. The amount of bandwidth for each sub-band can be expressed as:

$$B_{S,n} = B_O/2^n,$$

where $B_O$ is the optical bandwidth of the original signal and n is a positive integer. The first correlated signal $E_1$ comprises a first sub-band 404A for $E_1(f)=E_0(f)$ and a second sub-band 404B for $E_1(-f)=E_1(f)^*$. The first sub-band 404A spans from a frequency index of 1 to a frequency index of F. The frequency index of the first sub-band 404A is incremented in a direction from 1 to F which can be expressed as f=(1:1:F). The second sub-band 404B spans from a frequency index of −1 to a frequency index of −F. The frequency index of the second sub-band 404B is decremented in a direction from −1 to −F which can be expressed as f=(−1:−1:−F).

At block 406, a second correlated signal $E_2$ is generated based on the original correlated signal $E_0$. The second correlated signal $E_2$ comprises $2^n$ SI sub-bands with a fixed bandwidth similar to the first correlated signal $E_1$. The second correlated signal $E_2$ comprises a first sub-band 406A for $E_2(f)=E_0(F+1-f)$ and a second sub-band 406B for $E_2(-f)=E_2(f)^*$. The first sub-band 406A spans from a frequency index of 1 to a frequency index of F. The frequency index of the first sub-band 406A is decremented in a direction from F to 1 which can be expressed as f=(F:−1:1). The second sub-band 406B spans from frequency index of −1 to a frequency index of −F. The frequency index of the second sub-band 404B is incremented in a direction from −F to −1 which can be expressed as f=(−F:1:−1).

Figure 5:
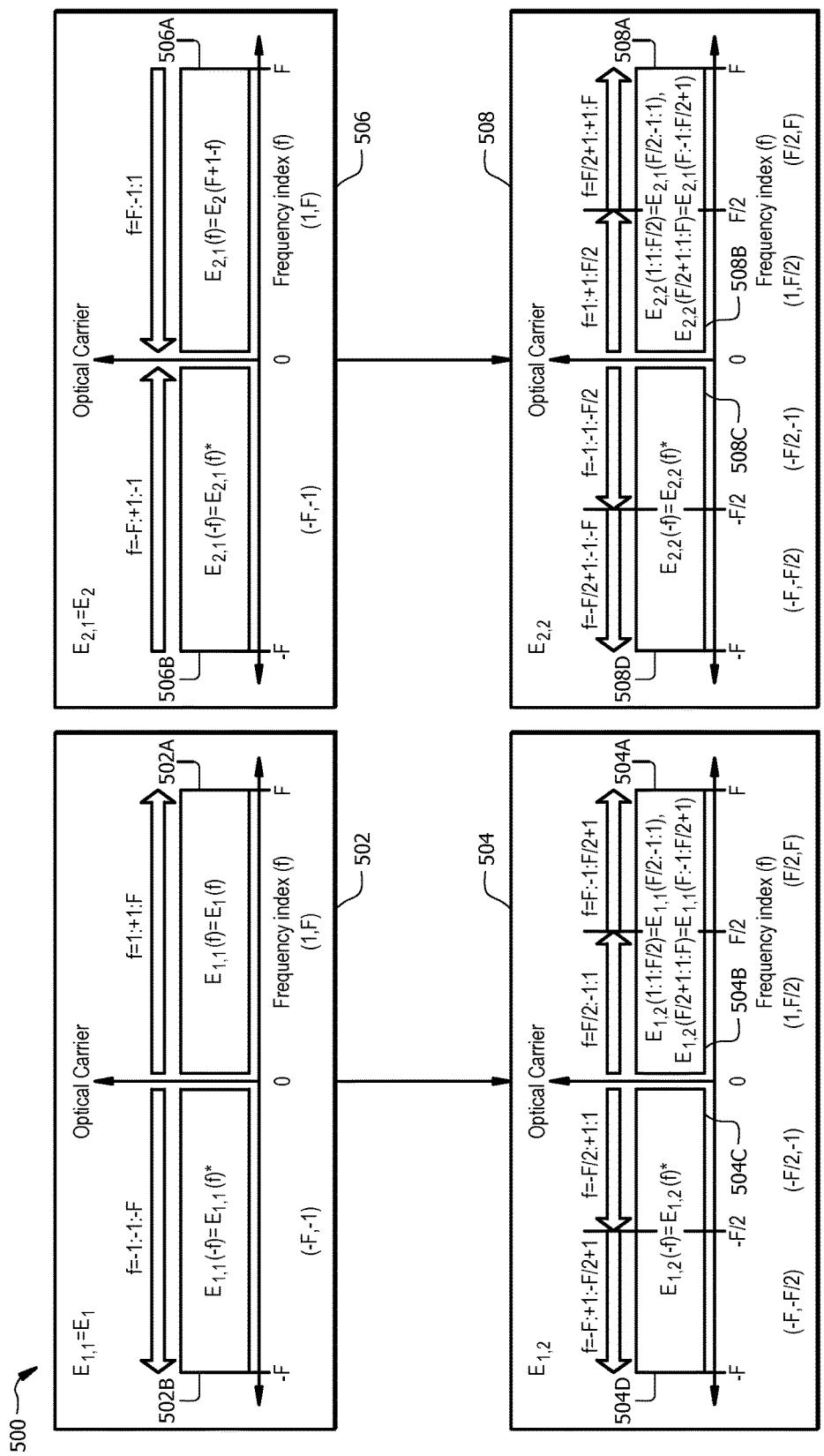
FIG. 5 is a schematic diagram of an embodiment of a spectrally inverted sub-band mapping for four correlated signals.

FIG. 5 is a schematic diagram of an embodiment of a spectrally inverted sub-band mapping 500 for four correlated signals. Correlated signals are generated by a transmitting network node, for example, OLT 302 and ONUs 304A-304C in FIG. 3.

At block 502, a first correlated signal $E_{1,1}$ is generated based on a previously generated correlated signal, for example, the first correlated signal $E_1$ described in block 404 in FIG. 4. The first correlated signal $E_{1,1}$ comprises a first sub-band 502A for $E_{1,1}(f)=E_1(f)$ and a second sub-band 502B for $E_{1,1}(-f)=E_{1,1}(f)^*$. The first sub-band 502A spans from a frequency index of 1 to a frequency index of F. The frequency index of the first sub-band 502A is incremented in a direction from 1 to F which can be expressed as f=(1:1:F). The second sub-band 502B spans from a frequency index of −1 to a frequency index of −F. The frequency index of the second sub-band 502B is decremented in a direction from −1 to −F which can be expressed as f=(−1:−1:−F).

At block 504, a second correlated signal $E_{1,2}$ is generated based on the first correlated signal $E_{1,1}$. The second correlated signal $E_{1,2}$ comprises a first sub-band 504A for $E_{1,2}((F/2)+1:1:F)=E_{1,1}(F:-1:(F/2)+1)$, a second sub-band 504B for $E_{1,2}(1:1:F/2)=E_{1,1}(F/2:-1:1)$, a third sub-band 504C for $E_{1,2}(-1:-1:-F/2)=E_{1,1}(-1:-1:-F/2)$, and a fourth sub-band 504D for $E_{1,2}((-F/2)+1:-1:-F)=E_{1,1}((-F/2)+1:-1:-F)$. The third sub-band 504C and the fourth sub-band 504D can also be expressed as $E_{1,2}(-f)=E_{1,2}(f)^*$ for f>0. The first sub-band 504A spans from a frequency index of F/2 to a frequency index of F. The frequency index of the first sub-band 504A is decremented in a direction from F to F/2 which can be expressed as f=(F:−1:(F/2)+1). The second sub-band 504B spans from a frequency index of 1 to a frequency index of F/2. The frequency index of the second sub-band 504B is decremented in a direction from F/2 to 1 which can be expressed as f=(F/2:−1:1). The third sub-band 504C spans from a frequency index of −1 to a frequency index of −F/2. The frequency index of the third sub-band 504C is incremented in a direction from −F/2 to −1 which can be expressed as f=(−F/2:1:−1). The fourth sub-band 504D spans from a frequency index of −F/2 to a frequency index of −F. The frequency index of the fourth sub-band 504D is incremented in a direction from −F to −F/2 which can be expressed as f=(−F:1:(−F/2)+1).

At block 506, a third correlated signal $E_{2,1}$ is generated based on a previously generated correlated signal, for example, the second correlated signal $E_2$ described in block 406 in FIG. 4. The third correlated signal $E_{2,1}$ comprises a first sub-band 506A for $E_{2,1}(f)=E_2(f)$ and a second sub-band 506B for $E_{2,1}(-f)=E_{2,1}(f)^*$. The first sub-band 506A spans from a frequency index of 1 to a frequency index of F. The frequency index of the first sub-band 506A is decremented in a direction from F to 1 which can be expressed as f=(F:−1:1). The second sub-band 506B spans from a frequency index of −F to a frequency index of −1. The frequency index of the second sub-band 506B is incremented in a direction from −F to −1 which can be expressed as f=(−F:1:−1).

At block 508, a fourth correlated signal $E_{2,2}$ is generated based on the third correlated signal $E_{2,1}$. The fourth correlated signal $E_{1,2}$ comprises a first sub-band 508A for $E_{2,2}(F/2+1:1:F)=E_{2,1}(F:-1:F/2+1)$, a second sub-band 508B for $E_{2,2}(1:1:F/2)=E_{2,1}(F/2:-1:1)$, a third sub-band 508C for $E_{2,2}$ $(-1:-1:-F/2)=E_{2,1}(-F/2:1:-1)$, and a fourth sub-band 508D for $E_{2,2}((-F/2)+1:-1:-F)=E_{2,1}(-F:1:(-F/2)+1)$. The third sub-band 508C and the fourth sub-band 508D can also be expressed as $E_{2,2}(-f)=E_{2,2}(f)^*$ for $f>0$. The first sub-band 508A spans from a frequency index of F/2 to a frequency index of F. The frequency index of the first sub-band 508A is incremented in a direction from F/2 to F which can be expressed as $f=((F/2)+1:1:F)$. The second sub-band 508B spans from a frequency index of 1 to a frequency index of F/2. The frequency index of the second sub-band 504B is incremented in a direction from 1 to F/2 which can be expressed as $f=(1:1:F/2)$. The third sub-band 508C spans from a frequency index of −1 to a frequency index of −F/2. The frequency index of the third sub-band 508C is decremented in a direction from −1 to −F/2 which can be expressed as $f=(-1:-1:-F/2)$. The fourth sub-band 508D spans from a frequency index of −F/2 to a frequency index of −F. The frequency index of the fourth sub-band 508D is decremented in a direction from −F/2 to −F which can be expressed as $f=((-F/2)+1:-1:-F)$.

Spectrally inverted sub-band mapping 400 in FIG. 4 and spectrally inverted sub-band mapping 500 in FIG. 5 can be expanded to generate eight correlated signals. For example, the transmitting network node generates eight correlated signals, such that for $f>0$, a first correlated signal is generated such that $E_{1,1,1}(f)=E_{1,1}(f)$ and $E_{1,1,1}(-f)=E_{1,1,1}(f)^*$, a second correlated signal is generated such that $E_{1,2,1}(f)=E_{1,2}(f)$ and $E_{1,2,1}(-f)=E_{1,2,1}(f)^*$, a third correlated signal is generated such that $E_{2,1,1}(f)=E_{2,1}(f)$ and $E_{2,1,1}(-f)=E_{2,1,1}(f)^*$, and a fourth correlated signal is generated such that $E_{2,2,1}(f)=E_{2,2}(f)$ and $E_{2,2,1}(-f)=E_{2,2,1}(f)^*$. The first correlated signal $E_{1,1,1}$ and the third correlated signal $E_{2,1,1}$ each have two sub-bands. The second correlated signal $E_{1,2,1}$ and the fourth correlated signal $E_{2,2,1}$ each have four sub-bands.

The fifth correlated signal, the sixth correlated signal, the seventh correlated signal, and the eighth correlated signal each have eight sub-bands that can be generated such that for $i\in(1,2)$ and $j\in(1,2)$, where 'i' is an index for a first division of the sub-bands and 'j' is an index for a second division of the sub-bands, a first sub-band is generated as $E_{i,j,2}(1:1:F/4)=E_{i,j,1}(F/4:-1:1)$, a second sub-band is generated as $E_{i,j,2}(F/4+1:1:F/2)=E_{i,j,1}(F/2:-1:F/4+1)$, a third sub-band is generated by $E_{i,j,2}(F/4*2+1:1:F/4*3)=E_{i,j,1}(F/4*3:-1:F/4*2+1)$, and a fourth sub-band is generated by $E_{i,j,2}(F/4*3+1:1:F)=E_{i,j,1}(F:-1:F/4*3+1)$. The fifth sub-band, the sixth sub-band, the seventh sub-band, and the eight sub-band correspond with the first sub-band, the second sub-band, the third sub-band, and the fourth sub-band using the relationship $Ei,j,2(-f)=(Ei,j,2(f))^*$.

In general, a process for generating $2^n$ correlated signals that have SI sub-bands is as follows. For $f>0$ and $i(1:n-1)\in(1,2)$, the following calculations can be performed:

(a) $2^{n-1}$ signals are obtained in the (n−1)-th step:

$E_{i(1),i(2),\ldots,i(n-1),1}(f)=E_{i(1),i(2),\ldots,i(n-1)}(f)$ and
$E_{i(1),i(2),\ldots,i(n-1),1}(-f)=E_{i(1),i(2),\ldots,i(n-1),1}(f)^*$,
and (b) $2^{n-1}$ signals are obtained that are spectrally inverted with respect to the above $2^{n-1}$ signals within each sub-band whose length is $F/2^{n-1}$:

$E_{i(1),i(2),\ldots,i(n-1),2}(m*F/2^{n-1}+1:1:(m+1)*F/2^{n-1})=$
$E_{i(1),i(2),\ldots,i(n-1),1}((m+1)*F/2^{n-1}:-1:m*F/2^{n-1}+1),E_{i(1),i(2),\ldots,i(n-1),2}(-f)=E_{i(1),i(2),\ldots,i(n-1),2}(f)^*$, where $m=0, 1, \ldots (2^{n-1}-1)$ is the index of the $2^{n-1}$ sub-bands with positive f.

At a transmitter side, the generated $2^n$ correlated signals may be transmitted at different times. The $2^n$ correlated signals are subsequently recovered at the receiver side. The sub-carriers of each correlated signal may be re-arranged to follow the order of the original signal or to restore the original frequency mapping, before being coherently superimposed to obtain the original signal with enhanced signal quality.

Figure 6:
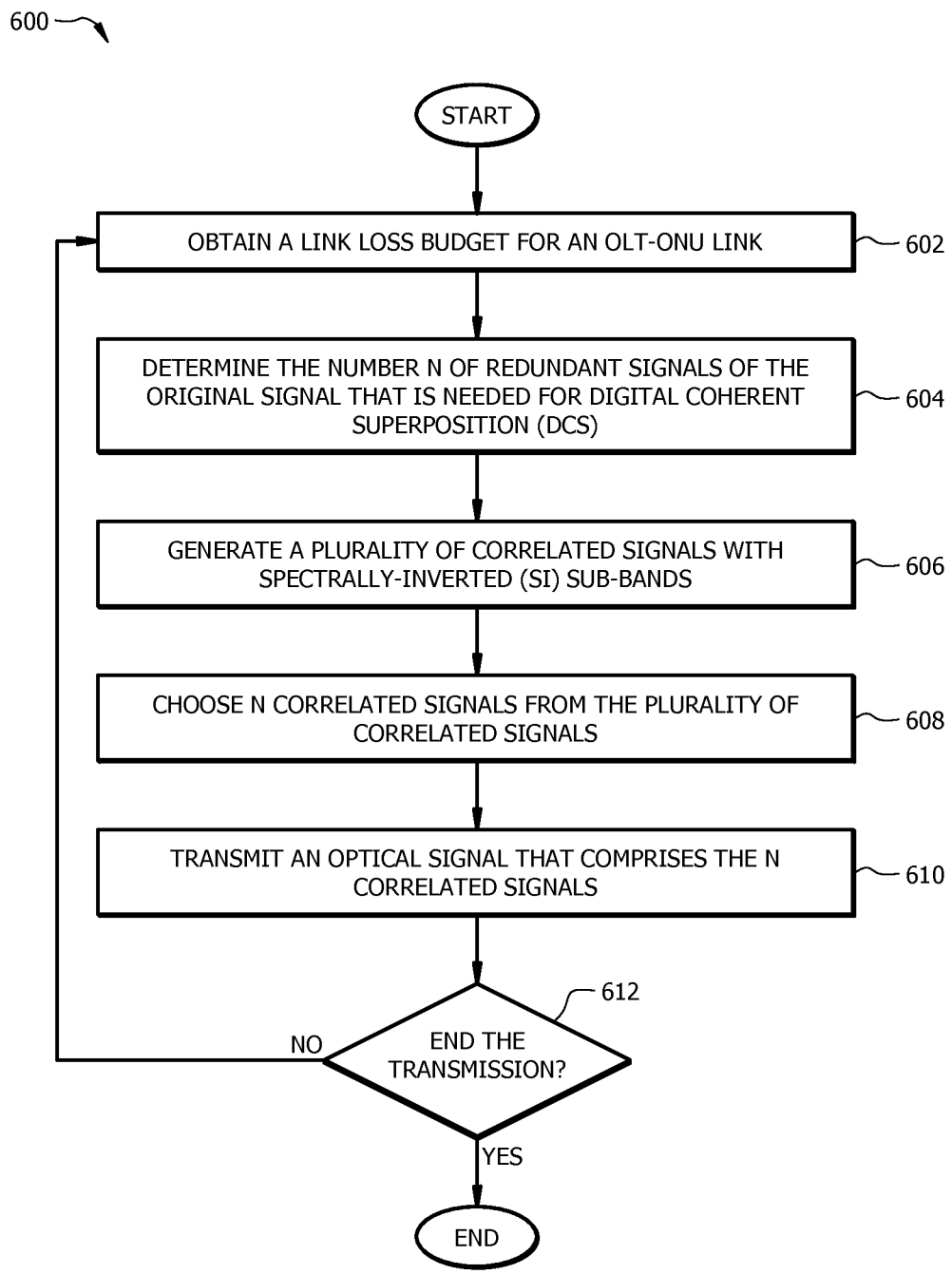
FIG. 6 is a flowchart of an embodiment of a frequency diversity transmission method for a transmitter.

FIG. 6 is a flowchart of an embodiment of a frequency diversity transmission method 600 for a transmitter. Method 600 is implemented by a network node, for example, OLT 302 and ONUs 304A-304C in FIG. 3, configured as a transmitter to transmit optical data signals. The transmitter obtains a link loss budget for a given OLT link, determines the number of redundant signals of the original signal that is needed for DCS, generates a plurality of correlated signals with SI sub-bands, chooses a plurality of the correlated signals, and transmits an optical signal that comprises the plurality of the correlated signals. At step 602, the transmitter obtains a link loss budget for a link between an OLT and ONU which may be referred to as an OLT-ONU link. For example, a link loss budget may be obtained from a controller or a network operator. In an embodiment, a link loss budget can be expressed as, link loss budget (e.g., in decibels (dB))=power at the transmitter (e.g., in decibel-milliwatts (dBm))−minimum power required at the receiver (e.g., in dBm). At step 604, the transmitter determines the number, N, of redundant signals of the original signal that is needed for DCS. For example, the transmitter determines the number of redundant signals that makes the link loss budget to be just above the actual link loss, which allows the OLT-ONU link to meet performance metrics (e.g., low bit error rate) and to maintain a high data rate. At step 606, the transmitter generates a plurality of correlated signals with SI sub-bands that corresponds with the number N of redundant signals. The plurality of correlated signals are generated using a spectrally inverted sub-band mapping similar to spectrally inverted sub-band mapping 400 in FIG. 4 and spectrally inverted sub-band mapping 500 in FIG. 5. Generating the plurality of correlated signals comprises generating $2^n$ signals where n is a positive integer. In an embodiment, n can be determined using $n=ceil(\log_2(N))$, where $ceil(x)$ is a ceiling function that results in the smallest integer value that is not less than x. The correlated signals have mutually spectrally-inverted sub-bands such that $E_{i(1),i(2),\ldots,i(n-1),2}(m*F/2^{n-1}\pm1:1:(m+1)*F/2^{n-1})=E_{i(1),i(2),\ldots,i(n-1),1}((m+1)*F/2^{n-1}:-1:m*F/2^{n-1}+1)$, where $f>0$, $i(1:n-1)\in(1,2)$, $m=0,1,\ldots(2^{n-1}-1)$ is the index of the $2^{n-1}$ sub-bands with positive f, and F is the largest positive frequency index. As the number of redundant signals increases, the "minimum power required" term of the link loss budget reduces which causes the link loss budget increase. At step 608, the transmitter chooses N correlated signals from the $2^n$ correlated signals. In an embodiment, the transmitter chooses the N redundant signals with a preference given to correlated signals with sub-bands that are spectrally inverted with respect to each other. At step 610, the transmitter transmits an optical signal that comprises the N correlated signals. The transmitter uses frequency diversity to transmit the N correlated signals at different time intervals within the optical signal. In an embodiment, the optical signal is a real-valued OFDM signal whose negative frequency components satisfy, $E(-f)=E(f)^*$ for $f>0$, where f is the OFDM sub-carrier index with the DC carrier corresponding to frequency index of $f=0$. Additionally, the optical signal may be a positive-valued suitable for intensity modulation and direct-detection. At step 612, the transmitter determines if the transmission is complete. If the transmission is complete, then the transmitter terminates method 600; otherwise, the transmitter returns to step 602.

Figure 7:
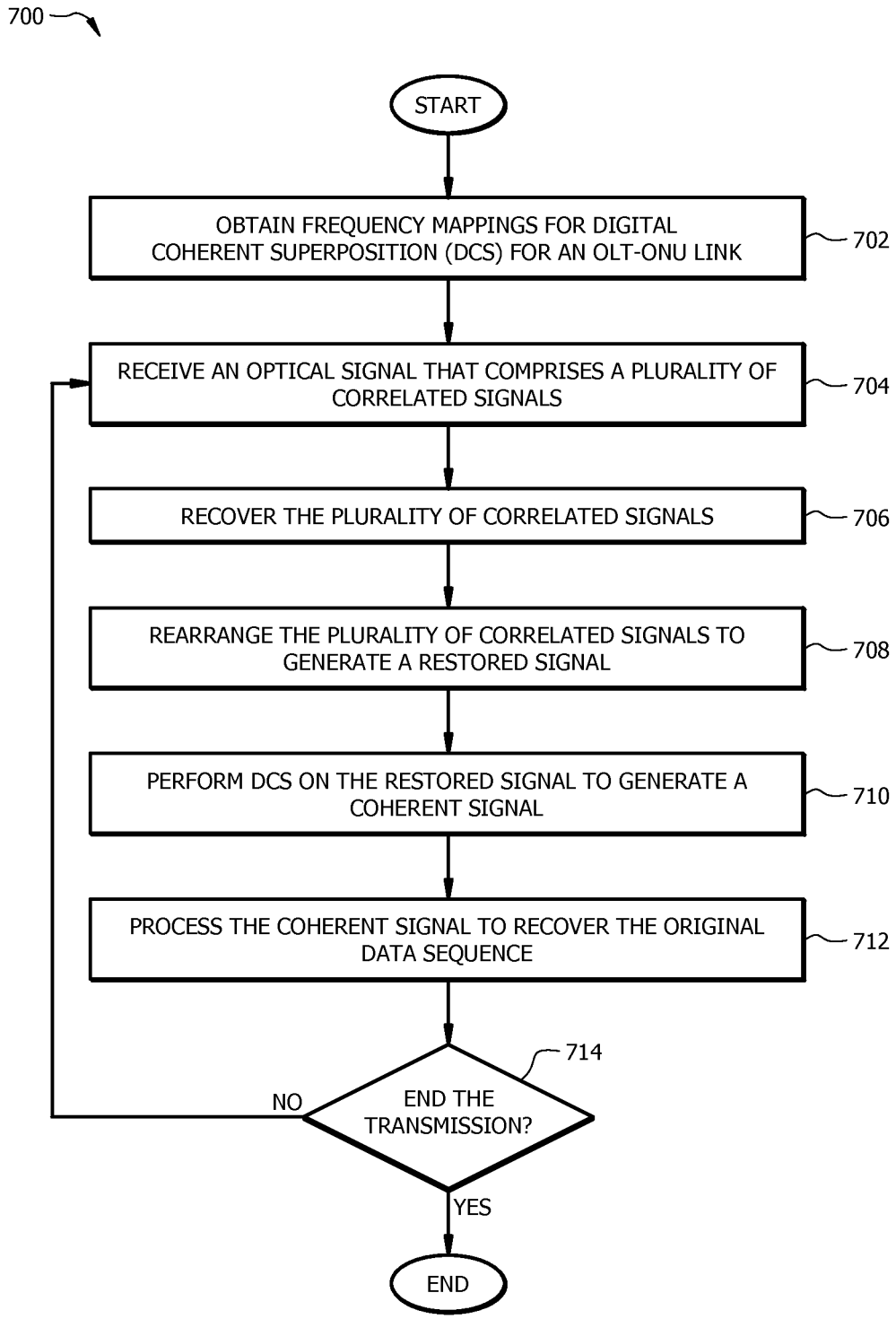
FIG. 7 is a flowchart of an embodiment of a frequency diversity receiving method for a receiver.

FIG. 7 is a flowchart of an embodiment of a frequency diversity receiving method 700 for a receiver. Method 700 is implemented by a network node, for example, OLT 302 and ONUs 304A-304C in FIG. 3, configured as a receiver to receive optical data signals. The receiver obtains frequency mappings for DCS for an OLT-ONU link, receives an optical signal that comprises a plurality of correlated signals, recovers the plurality of correlated signals, rearranges the correlated signals to generate a restored signal, performs DCS on the restored signal to generate a coherent signal, and processes the coherent signal to recover the original data sequence. At step 702, the receiver obtains frequency mappings for DCS for an OLT-ONU link. For example, frequency mappings may be obtained from a controller or a network operator. A frequency mapping is employed to associate or rearrange a plurality of correlated signals to generate a restored original signal. At step 704, the receiver receives an optical signal that comprises a plurality of correlated signals. The plurality of correlated signals are correlated signals that are generated using a spectrally inverted sub-band mapping similar to spectrally inverted sub-band mapping 400 in FIG. 4 and spectrally inverted sub-band mapping 500 in FIG. 5. At step 706, the receiver recovers the plurality of correlated signals from the optical signal. The receiver may recover the plurality of correlated signals using digital signal processing or any other suitable technique as would be appreciated by one of ordinary skill in the art upon viewing this disclosure. At step 708, the receiver rearranges the plurality of correlated signals to generate a restored original signal. For example, the receiver uses the frequency mapping to determine a correlated signal ordering and/or to rearrange the plurality of correlated signals to generate the restored original signal. At step 710, the receiver performs DCS on the restored signal to generate a coherent signal. For example, DCS may comprise summing a plurality of electric fields (E-fields) of the restored signal to generate the coherent signal. At step 712, the receiver processes the coherent signal to recover the original data sequence. For example, the receiver demodulates and decodes the coherent signal to recover the original data sequence. At step 714, the receiver determines if the transmission is complete. If the transmission is complete, then the receiver terminates method 700; otherwise, the receiver returns to step 704.

Figure 8:
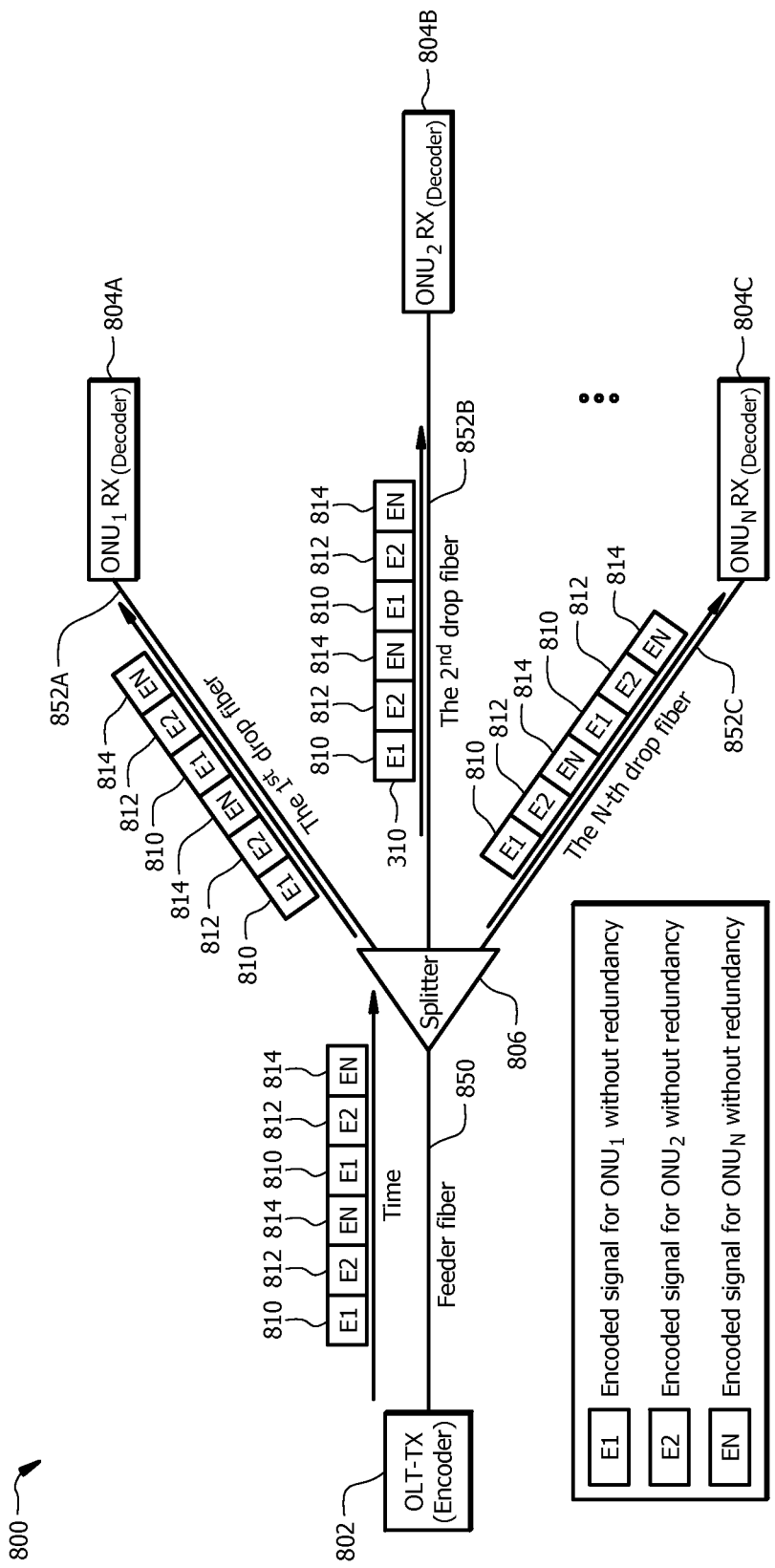
FIG. 8 is schematic diagram of another embodiment of an optical network communicating data traffic between an OLT and a number of ONUs.

FIG. 8 is schematic diagram of another embodiment of an optical network 800 communicating data traffic between an OLT 802 and a number of ONUs 804A-804C. OLT 802 and ONUs 804A-804C may be configured similarly to OLT 108 and ONU 106 in FIG. 1. OLT 802 is optically coupled to a splitter 806 using a feeder fiber 850. Splitter 806 is optically coupled to each of the ONUs 804A-804C using drop fibers 852A-852C, respectively. Optical network 800 may be configured as shown or in any other suitable manner.

In FIG. 8, OLT 802 is configured as a transmitter and ONUs 804A-804C are configured as receivers. Data traffic is communicated in a downstream direction from OLT 802 to ONUs 804A-804C, but it can be easily extended to illustrate data traffic being communicated in an upstream direction. Data traffic is communicated between OLT 802 and ONUs 804A-804C using a signal that is encoded by a predetermined code. The predetermined code acts on multiple sub-carriers from multiple sub-bands of the original signal. OLT 802 is configured to transmit encoded data traffic. ONUs 804A-804C are configured to decode data traffic to reconstruct the original signal. As an example, OLT 802 may be configured to send encoded data 810 for ONU 804A, encoded data 812 for ONU 804B, and encoded data 814 for ONU 804C without redundancy.

In an embodiment, the transmitter is configured to not apply redundancy for transmitting data. As an example, the transmitter encodes four sub-carriers that are selected from four different sub-bands that each have a bandwidth of $B_S=B_O/4$, where $B_O$ is the optical bandwidth of the signal. A plurality of sub-bands can be generated similarly to those generated in correlated signals that are generated using a spectrally inverted sub-band mapping similar to spectrally inverted sub-band mapping 400 in FIG. 4 and spectrally inverted sub-band mapping 500 in FIG. 5. If a silver code is used, the four sub-carriers, [S1,S2,S3,S4] will be encoded to generate four new sub-carriers at the four original frequency locations as:

$$S_1'=S_1+Z_3$$

$$S_2'=S_2-Z_4$$

$$S_3'=-S_2^*-Z_4^*$$

$$S_4'=S_1^*-Z_3^*$$

where, $$\begin{bmatrix} z_3 \\ z_4 \end{bmatrix} = \frac{1}{\sqrt{7}} \begin{bmatrix} 1+i & -1+2i \\ 1+2i & 1-i \end{bmatrix} \begin{bmatrix} s_3 \\ s_4 \end{bmatrix} \text{ and } \begin{bmatrix} z_3 \\ z_4 \end{bmatrix}$$

is a newly constructed signal group that is mapped to the original sub-carriers or signal group. The receiver decodes or reverses the above operation to reconstruct the original sub-carriers.

In an embodiment, the selection of the four sub-carriers to be encoded may be performed using four frequency mappings, for example, similar to spectrally inverted sub-band mapping similar to spectrally inverted sub-band mapping 400 in FIG. 4 and spectrally inverted sub-band mapping 500 in FIG. 5. For f>0 we have a first mapping: $E_1(f)=E_0(f)$, a second mapping: $E_2(f)=E_0(F+1-f)$, a third mapping: $E_3(1:1:F/2)=E_0(F/2:-1:1)$ and $E_3(F/2+1:1:F)=E_0(F:-1:F/2+1)$, and a fourth mapping: $E_4(1:1:F/2)=E_0(F/2+1:1:F)$ and $E_4(F/2+1:1:F)=E_0(1:+1:F/2)$. For f<0 we have $E_n(f)=E_n(-f)^*$, where n∈(1,2,3,4).

As an example, for F=16, frequency mappings are calculated as:

1st mapping: 1, 2, 3, 4, 5, 6, 7, 8; 9, 10, 11, 12, 13, 14, 15, 16

2nd mapping: 16, 15, 14, 13, 12, 11, 10, 9; 8, 7, 6, 5, 4, 3, 2, 1

3rd mapping: 8, 7, 6, 5, 4, 3, 2, 1; 16, 15, 14, 13, 12, 11, 10, 9

4th mapping: 9, 10, 11, 12, 13, 14, 15, 16; 1, 2, 3, 4, 5, 6, 7, 8.

The calculated frequency mapping results in the following four (F/4) subsets of sub-carriers that are encoded and decoded together:

[1, 16, 8, 9], [2, 15, 7, 10], [3, 14, 6, 11], [4, 13, 5, 12]. For f<0 we have $E_n(f)=E_n(-f)^*$, where n∈(1, 2, 3, 4).

Figure 9:
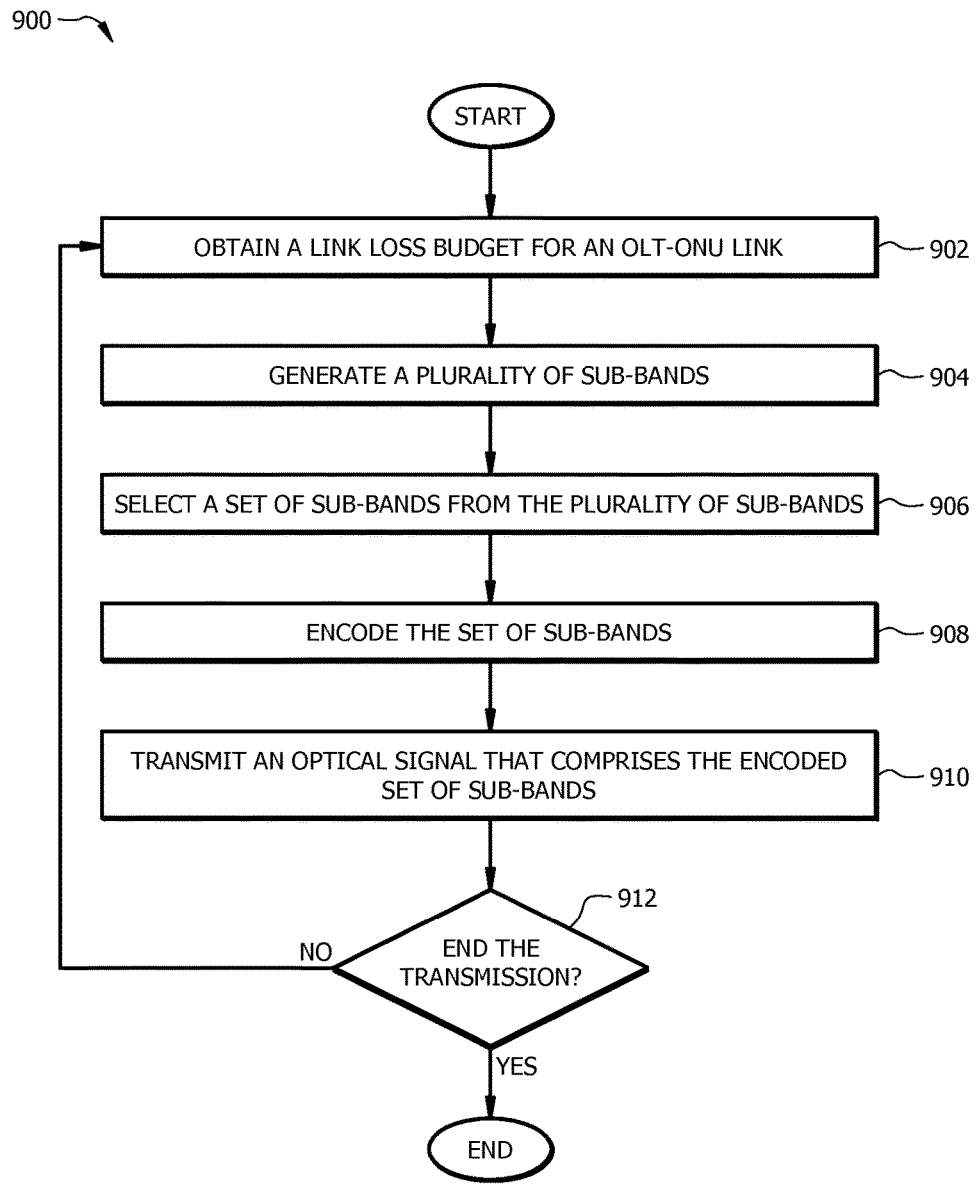
FIG. 9 is a flowchart of an embodiment of a frequency diversity transmission method for a transmitter.

FIG. 9 is a flowchart of an embodiment of a frequency diversity transmission method 900 for a transmitter. Method 900 is implemented by a network node, for example, OLT 802 and ONUs 804A-804C in FIG. 8, configured as a transmitter to transmit optical data signals. The transmitter obtains a link loss budget for a given OLT link, generates a plurality of sub-bands, encodes a set of sub-bands, and transmits an optical signal that comprises the plurality of the correlated signals. At step 902, the transmitter obtains a link loss budget for an OLT-ONU link. For example, a link loss budget may be obtained from a controller or a network operator. At step 904, the transmitter generates a plurality of sub-bands. The plurality of sub-bands is generated similarly to spectrally inverted sub-band mapping 400 in FIG. 4 and spectrally inverted sub-band mapping 500 in FIG. 5. At step 906, the transmitter selects a set of sub-bands from the plurality of sub-bands. The sub-bands may be selected based on the bandwidth of the sub-bands and the link loss budget of the OLT-ONU link. At step 908, the transmitter uses a frequency mapping to encode the set of sub-bands. The frequency mapping encodes the set of sub-bands by remapping or rearranging the order of sub-bands. Examples of encoding schemes include, but are not limited to, space-time codes, silver codes, and golden codes. At step 910, the transmitter transmits an optical signal that comprises the encoded set of sub-bands. For example, the transmitter uses frequency diversity to transmit the optical signal. At step 912, the transmitter determines if the transmission is complete. If the transmission is complete, then the transmitter terminates method 900; otherwise, the transmitter returns to step 902.

Figure 10:
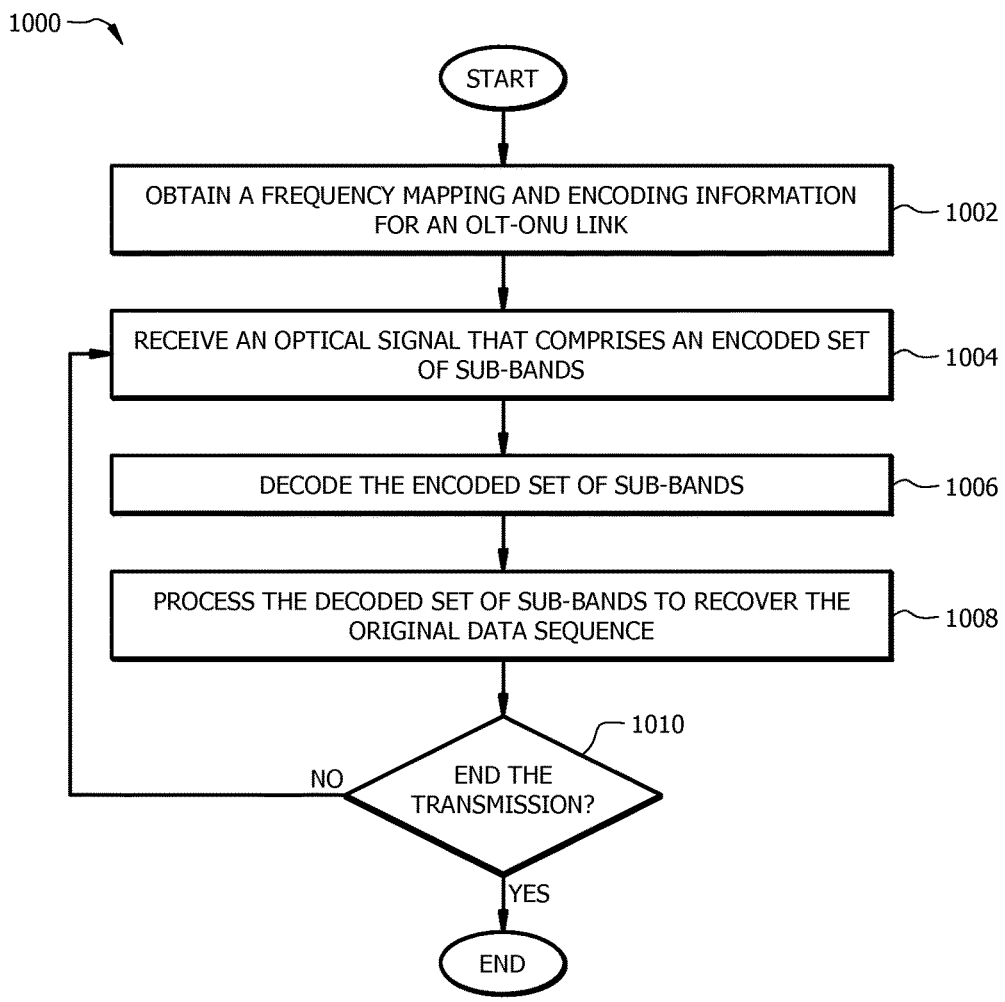
FIG. 10 is a flowchart of another embodiment of a frequency diversity receiving method for a receiver.

FIG. 10 is a flowchart of another embodiment of a frequency diversity receiving method 1000 for a receiver. Method 1000 is implemented by a network node, for example, OLT 802 and ONUs 804A-804C in FIG. 8, configured as a receiver for receiving optical data signals. The receiver obtains frequency mappings and/or encoding information for an OLT-ONU link, receives an optical signal that comprises an encoded set of sub-bands, decodes the encoded set of sub-bands, and processes the decoded set of sub-bands to recover the original data sequence. At step 1002, the receiver obtains frequency mappings and/or encoding information for an OLT-ONU link. For example, frequency mappings and encoding information may be obtained from a controller or a network operator. A frequency mapping and encoding information is employed to associate or rearrange a plurality of sub-bands to generate a restored original signal. At step 1004, the receiver receives an optical signal that comprises an encoded set of sub-bands. The encoded set of sub-bands are sub-bands that are generated using a spectrally inverted sub-band mapping similar to spectrally inverted sub-band mapping 400 in FIG. 4 and spectrally inverted sub-band mapping 500 in FIG. 5. At step 1006, the receiver decodes the encoded set of sub-bands to generate a restored original signal. For example, the receiver uses the frequency mapping which comprises encoding information to determine an order and to rearrange the sub-bands to generate the restored original signal. At step 1008, the receiver processes the decoded set of sub-bands to recover the original data sequence. For example, the receiver demodulates the decoded set of sub-bands to recover the original data sequence. At step 1010, the receiver determines if the transmission is complete. If the transmission is complete, then the receiver terminates method 1000; otherwise, the receiver returns to step 1004.

Figure 11:
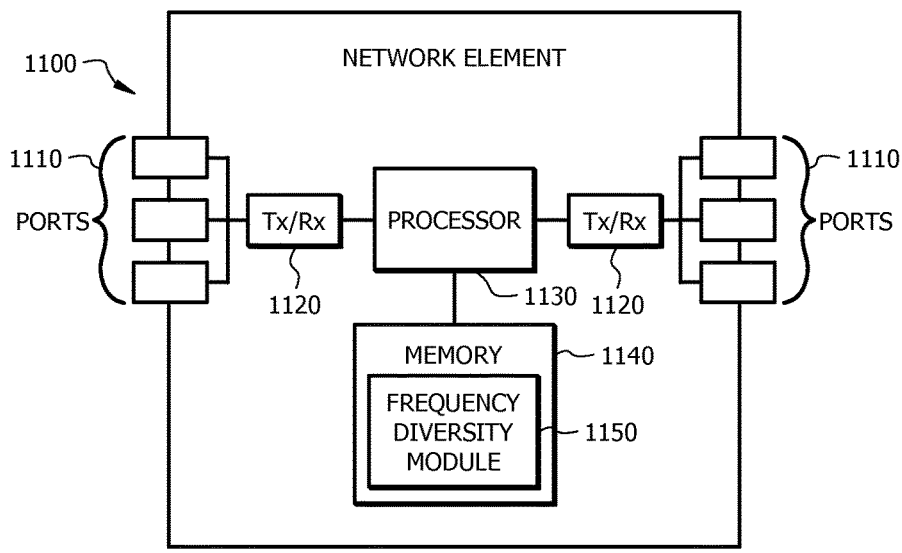
FIG. 11 is a schematic diagram of an embodiment of a network element.

FIG. 11 is a schematic diagram of an embodiment of a network element 1100. The network element 1100 may be suitable for implementing the disclosed embodiments. Network element 1100 may be any device (e.g., a modem, a switch, router, bridge, server, client, controller, etc.) that transports or assists with transporting data through a network, system, and/or domain. For example, network element 1100 may be implemented in OLT 302 and ONUs 304A-304C in FIG. 3 and OLT 802 and ONUs 804A-804C in FIG. 8. Network element 1100 comprises ports 1110, transceiver units (Tx/Rx) 1120, a processor 1130, and a memory 1140 comprising a frequency diversity module 1150. Ports 1110 are coupled to Tx/Rx 1120, which may be transmitters, receivers, or combinations thereof. The Tx/Rx 1120 may transmit and receive data via the ports 1110. Processor 1130 is configured to process data. Memory 1140 is configured to store data and instructions for implementing embodiments described herein. The network element 1100 may also comprise electrical-to-optical (EO) components and optical-to-electrical (OE) components coupled to the ports 1110 and Tx/Rx 1120 for receiving and transmitting electrical signals and optical signals.

The processor 1130 may be implemented by hardware and software. The processor 1130 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 1130 is in communication with the ports 1110, Tx/Rx 1120, and memory 1140.

The memory 1140 comprises one or more of disks, tape drives, and solid-state drives and may be used as an over-flow data storage device, to store programs when such programs are selected for execution, and to store instructions and data that are read during program execution. The memory 1140 may be volatile and non-volatile and may be read-only memory (ROM), random-access memory (RAM), ternary content-addressable memory (TCAM), and static random-access memory (SRAM). Frequency diversity module 1150 is implemented by processor 1130 to execute the instructions for implementing various embodiments for transmitting and receiving optical signals that comprise correlated signals or correlated signal sub-bands with or without redundancy. The inclusion of frequency diversity module 1150 provides an improvement to the functionality of network element 1100. The frequency diversity module 1150 also effects a transformation of network element 1100 to a different state. Alternatively, frequency diversity module 1150 is implemented as instructions stored in the processor 1130.

Figure 12:
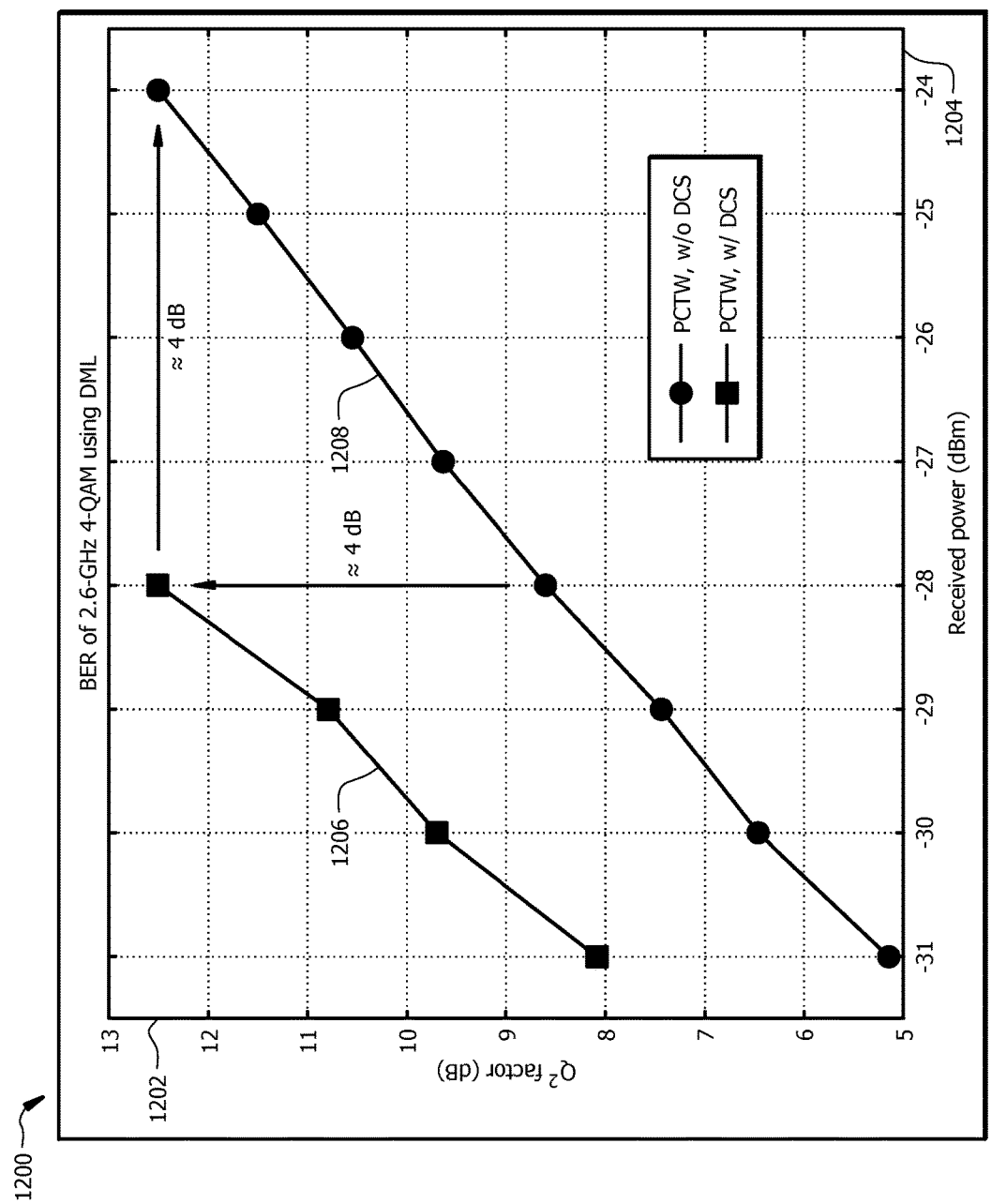
FIG. 12 is a graph of an embodiment of bit error rate (BER) performance of a directly modulated laser (DML) using a 2.6 gigahertz (GHz) signal with 4-quadrature amplitude modulation (QAM).

FIG. 12 is a graph 1200 of an embodiment of bit error rate (BER) performance of a directly modulated laser (DML) using a 2.6 gigahertz (GHz) signal with 4-quadrature amplitude modulation (QAM). Graph 1200 can be obtain using network elements configured similarly to OLT 302 and ONUs 304A-304C in FIG. 3 and OLT 802 and ONUs 804A-804C in FIG. 8. Axis 1202 indicates a $Q^2$ quality factor in dB and axis 1204 indicates received power in dBm. Curve 1206 represents a phase-conjugated twin wave (PCTW) signal without DCS. Curve 1208 represents a PCTW signal with DCS. An improvement of about four decibels is observed when DCS of two signals with SI sub-bands are used.

Figure 13:
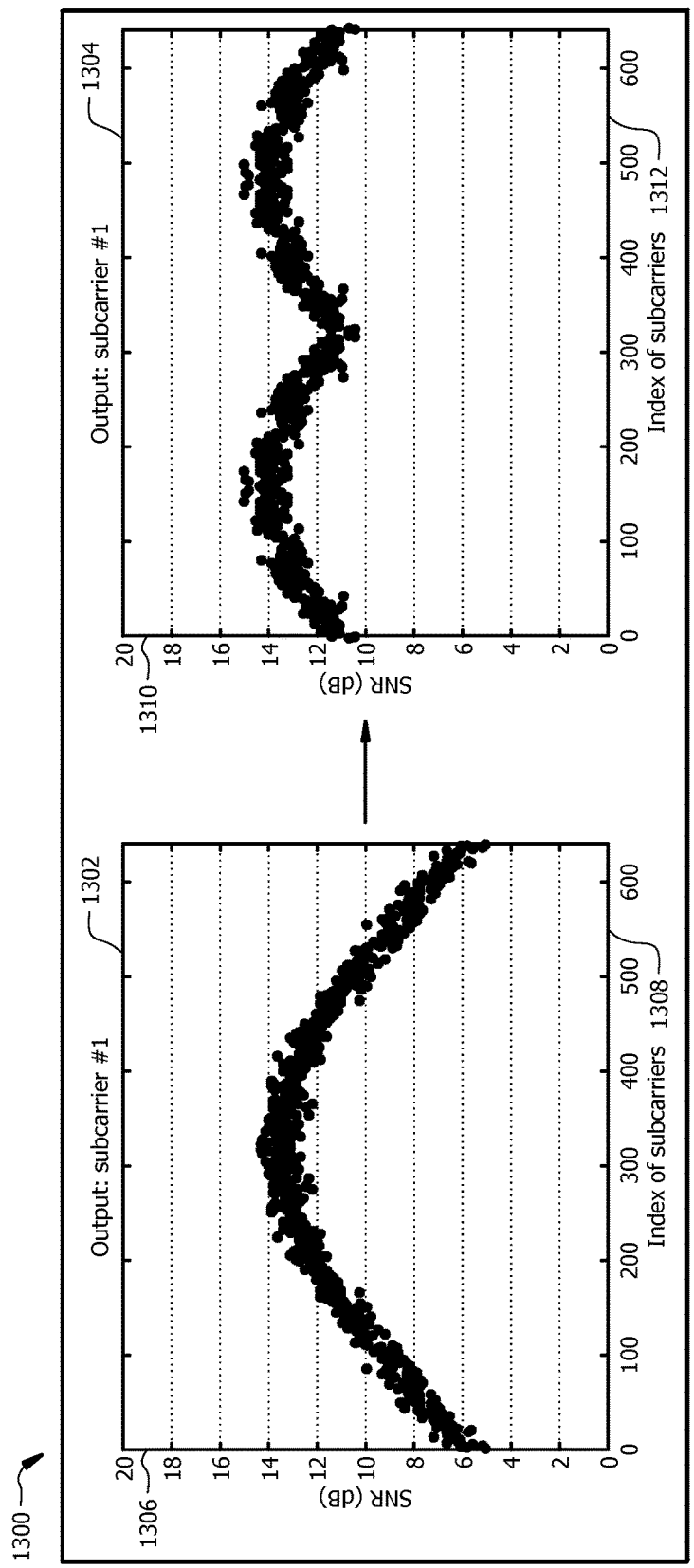
FIG. 13 is a performance comparison of an embodiment of signal-to-noise (SNR) responses for a 10 gigabit per second (Gb/s) discrete multi-tone (DMT) signal over 40 kilometers (km) standard single mode fiber (SSMF) using digital coherent superposition (DCS) of two signals with spectrally-inverted (SI) sub-bands.

FIG. 13 is a performance comparison 1300 of an embodiment of SNR responses for a 10 gigabit per second (Gb/s) DMT signal over 40 km standard single-mode fiber (SSMF) using DCS of two signals with SI sub-bands. Performance comparison 1300 can be obtain using network elements configured similarly to OLT 302 and ONUs 304A-304C in FIG. 3 and OLT 802 and ONUs 804A-804C in FIG. 8. Graph 1302 is an SNR response of the signal without using DCS. Axis 1306 indicates SNR in dB and axis 1308 indicates an index of sub-carriers. Graph 1302 has an SNR of about −28 dBm. Graph 1304 is an SNR response of the signal using DCS of two signals with SI sub-bands. Axis 1310 indicates SNR in dB and axis 1312 indicates an index of sub-carriers.

Using DCS of two signals with SI sub-bands, improves the SNT response of the signal by about 0.09 dB.

Figure 14:
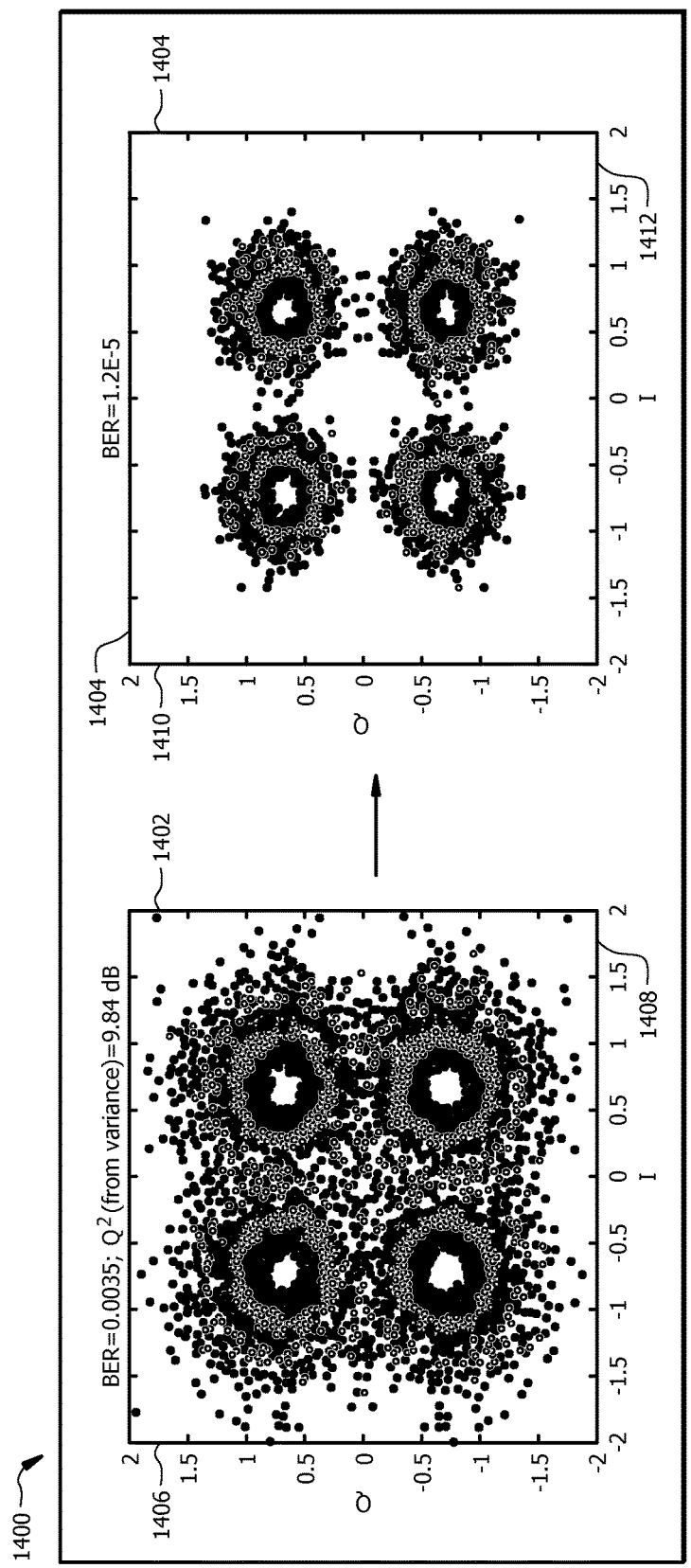
FIG. 14 is a performance comparison of an embodiment of BER performance for a 10 Gb/s DMT signal over 40 km SSMF using DCS of two signals with SI sub-bands.

FIG. 14 is a performance comparison 1400 of an embodiment of BER performance for a 10 Gb/s DMT signal over 40 km SSMF using DCS of two signals with SI sub-bands. Performance comparison 1400 can be obtain using network elements configured similarly to OLT 302 and ONUs 304A-304C in FIG. 3 and OLT 802 and ONUs 804A-804C in FIG. 8. Graph 1402 is a constellation graph of the signal without using DCS. Axis 1406 indicates a position in the Q-plane and axis 1408 indicates a position in the I-plane. Graph 1402 has a BER of 0.0035. Graph 1404 is a constellation graph of the signal using DCS of two signals with SI sub-bands. Axis 1410 indicates a position in the Q-plane and axis 1412 indicates a position in the I-plane. Graph 1404 has a BER of 1.2 E-5. Using DCS of two signals with SI sub-bands, improves the BER and increases the gain by about 3.9 dB.

Figure 15:
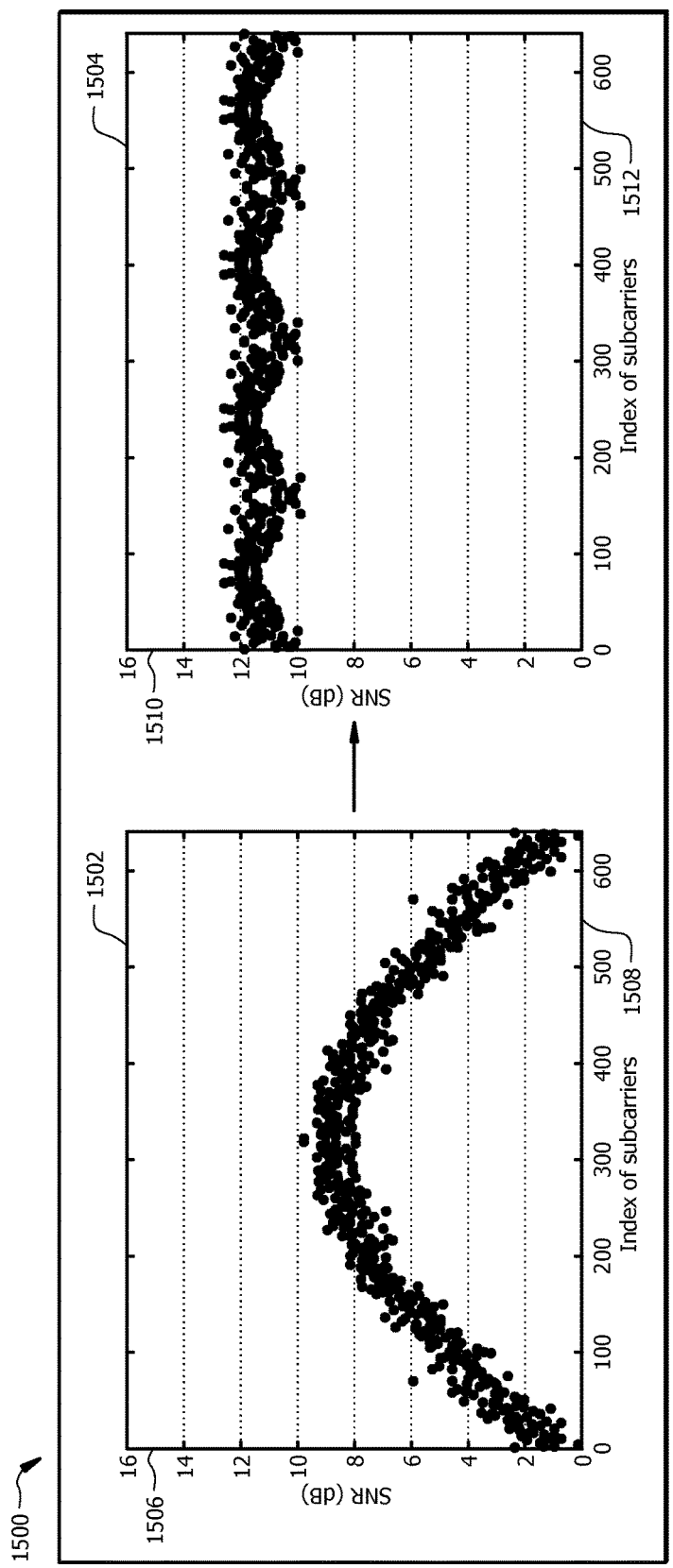
FIG. 15 is a performance comparison of an embodiment of SNR responses for a 10 Gb/s DMT signal over 40 km SSMF using DCS of four signals with SI sub-bands.

FIG. 15 is a performance comparison 1500 of an embodiment of SNR responses for a 10 Gb/s DMT signal over 40 km SSMF using DCS of four signals with SI sub-bands. Performance comparison 1500 can be obtain using network elements configured similarly to OLT 302 and ONUs 304A-304C in FIG. 3 and OLT 802 and ONUs 804A-804C in FIG. 8. Graph 1502 is an SNR response of the signal without using DCS. Axis 1506 indicates SNR in dB and axis 1508 indicate an index of sub-carriers. Graph 1502 has an SNR of about −31 dBm. Graph 1504 is an SNR response of the signal using DCS of four signals with SI sub-bands. Axis 1510 indicates SNR in dB and axis 1512 indicate an index of sub-carriers. Using DCS of four signals with SI sub-bands, improves the SNT response of the signal by about 0.7 dB.

Figure 16:
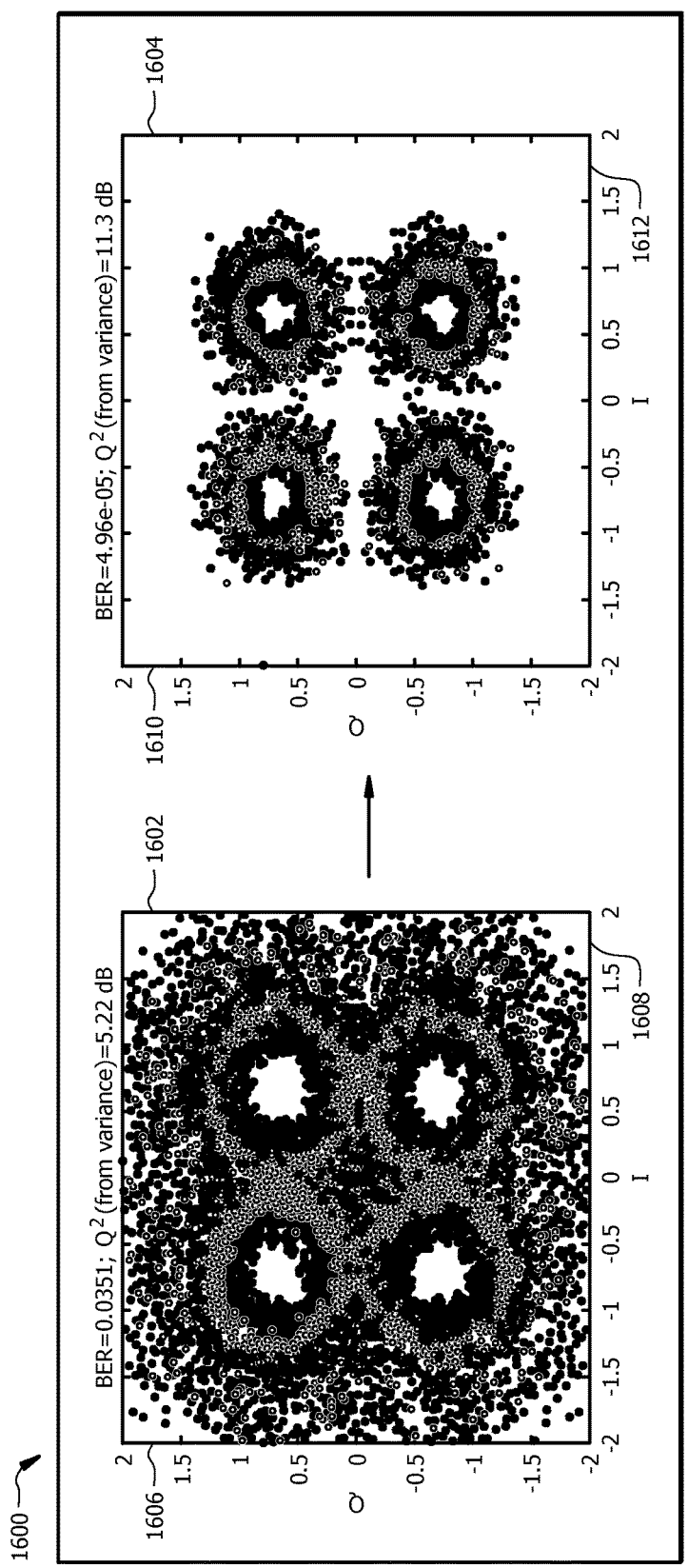
FIG. 16 is a performance comparison of an embodiment of BER performance for a 10 Gb/s DMT signal over 40 km SSMF using DCS of four signals with SI sub-bands.

FIG. 16 is a performance comparison 1600 of an embodiment of BER performance for a 10 Gb/s DMT signal over 40 km SSMF using DCS of four signals with SI sub-bands. Performance comparison 1600 can be obtain using network elements configured similarly to OLT 302 and ONUs 304A-304C in FIG. 3 and OLT 802 and ONUs 804A-804C in FIG. 8. Graph 1602 is a constellation graph of the signal without using DCS. Axis 1606 indicates a position in the Q-plane and axis 1608 indicates a position in the I-plane. Graph 1602 has a BER of 0.0351. Graph 1604 is a constellation graph of the signal using DCS of four signals with SI sub-bands. Axis 1610 indicates a position in the Q-plane and axis 1612 indicates a position in the I-plane. Graph 1604 has a BER of 4.96 E-5. Using DCS of four signals with SI sub-bands, improves the BER and increases the gain by about 6.7 dB.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An optical data transmission method implemented in a network node, comprising:
   partitioning an optical signal into a plurality of frequency sub-bands, at least one of the plurality of frequency sub-bands being located on either side of a subcarrier index;
   generating a signal frequency mapping that rearranges the plurality of frequency sub-bands;
   choosing a plurality of frequency components based on the signal frequency mapping to form a set of frequency components; and
   transmitting the set of frequency components using frequency diversity transmission.

2. The method of claim 1, wherein the signal frequency mapping comprises mutually spectrally inverted sub-bands.

3. The method of claim 1, wherein transmitting the set of frequency components is performed without redundancy.

4. The method of claim 3, wherein transmitting the set of frequency components is based on a silver code.

5. The method of claim 1, wherein the set of frequency components comprises a plurality of correlated signals.

6. An optical data transmission method implemented in a network node, comprising:
   partitioning an optical signal into a plurality of frequency sub-bands;
   generating a signal frequency mapping that rearranges the plurality of frequency sub-bands;
   choosing a plurality of frequency components based on the signal frequency mapping to form a set of frequency components;
   transmitting the set of frequency components using frequency diversity transmission;
   obtaining a link loss budget for a given optical line terminal (OLT) link;
   determining a number of redundant copies of an original signal needed for a digital coherent superposition based on the link loss budget;
   generating a plurality of correlated signals that corresponds with the number of redundant copies; and
   transmitting the correlated signals.

7. The method of claim 6, wherein generating the plurality of correlated signals comprises generating $2^n$ signals where n is a positive integer.

8. The method of claim 7, wherein the $2^n$ signals have mutually spectrally-inverted sub-bands.

9. An apparatus comprising:
   a transmitter configured to employ frequency diversity transmission;
   a memory; and
   a processor coupled to the transmitter and the memory, the processor configured to:
      partition an optical signal into a plurality of frequency sub-bands, at least one of the plurality of frequency sub-bands being located on either side of a subcarrier index;
      generate a plurality of signal frequency mappings that rearranges the plurality of frequency sub-bands;
      choose a plurality of frequency components based on the signal frequency mappings to form a set of frequency components; and
      transmit the set of frequency components.

10. The apparatus of claim 9, wherein the signal frequency mappings comprises mutually spectrally inverted sub-bands.

11. The apparatus of claim 9, wherein transmitting the set of frequency components is performed without redundancy.

12. The apparatus of claim 11, wherein transmitting the set of frequency components is based on space-time code.

13. The apparatus of claim 9, wherein the set of frequency components comprises a plurality of correlated signals.

14. The apparatus of claim 13, wherein the plurality of correlated signals comprises generating $2^n$ signals where n is a positive integer.

15. An apparatus comprising:
- a transmitter configured to employ frequency diversity transmission;
- a memory; and
- a processor coupled to the transmitter and the memory, the processor configured to:
  - partition an optical signal into a plurality of frequency sub-bands;
  - generate a plurality of signal frequency mappings that rearranges the plurality of frequency sub-bands;
  - choose a plurality of frequency components based on the signal frequency mappings to form a set of frequency components, the set of frequency components comprising a plurality of correlated signals comprising $2^n$ signals, where n is a positive integer having mutually spectrally-inverted sub-bands; and
  - transmit the set of frequency components.

* * * * *